United States Patent
But et al.

(10) Patent No.: US 10,872,461 B2
(45) Date of Patent: Dec. 22, 2020

(54) METHOD AND DEVICE FOR OBTAINING 3D IMAGES

(71) Applicant: Samsung Electronics Co., Ltd., Gyeonggi-do (KR)

(72) Inventors: Andrii But, Kyiv (UA); Ivan Safonov, Kyiv (UA); Konstantin Morozov, Kyiv (UA); Ruslan Iermolenko, Kyiv (UA); Yaroslav Lavrenyuk, Kyiv (UA)

(73) Assignee: Samsung Electronics Co., Ltd

( * ) Notice: Subject to any disclaimer, the term of this patent is extended or adjusted under 35 U.S.C. 154(b) by 16 days.

(21) Appl. No.: 16/244,486

(22) Filed: Jan. 10, 2019

(65) Prior Publication Data

US 2020/0074720 A1 Mar. 5, 2020

(30) Foreign Application Priority Data

Aug. 31, 2018 (KR) .................. 10-2018-0103662
Sep. 20, 2018 (KR) .................. 10-2018-0112975

(51) Int. Cl.
*G06T 15/00* (2011.01)
*G06T 15/10* (2011.01)
(Continued)

(52) U.S. Cl.
CPC .............. *G06T 15/10* (2013.01); *G01S 17/89* (2013.01); *G06T 7/11* (2017.01); *G06T 7/596* (2017.01)

(58) Field of Classification Search
CPC .......... G06T 15/10; G06T 7/593; G01S 17/89
(Continued)

(56) References Cited

U.S. PATENT DOCUMENTS 8,548,270 B2 * 10/2013 Katz .................. G01S 17/18
382/286
8,983,233 B2 * 3/2015 Katz .................. G01S 17/18
382/286
(Continued)

FOREIGN PATENT DOCUMENTS

EP 2 708 914 3/2014

OTHER PUBLICATIONS

Li F, Chen H, Pediredla A, Yeh C, He K, Veeraraghavan A, Cossairt O. CS-ToF: High-resolution compressive time-of-flight imaging. Optics express. Dec. 11, 2017;25(25):31096-110.*
(Continued)

*Primary Examiner* — Phu K Nguyen
(74) *Attorney, Agent, or Firm* — The Farrell Law Firm, P.C.

(57) ABSTRACT

A method and device are provided for obtaining a 3D image. The method includes sequentially projecting a plurality of beams to an object, each of the plurality of projected beams corresponding to a respective one of a plurality of sectors included in a pattern; detecting a plurality of beams reflected off of the object corresponding to the plurality of projected beams; identifying time-of-flight (ToF) of each of the plurality of projected beams based on the plurality of detected beams; identifying a distortion of the pattern, which is caused by the object, based on the plurality of detected beams; and generating a depth map for the object based on the distortion of the pattern and the ToF of each of the plurality of projected beams, wherein the plurality of detected beams are commonly used to identify the ToF and the distortion of the pattern.

18 Claims, 11 Drawing Sheets

(51) Int. Cl.
   *G06T 7/11* (2017.01)
   *G01S 17/89* (2020.01)
   *G06T 7/593* (2017.01)

(58) Field of Classification Search
   USPC .......................................................... 345/418
   See application file for complete search history.

(56) References Cited

U.S. PATENT DOCUMENTS

| | | | |
|---|---|---|---|
| 9,405,008 B2* | 8/2016 | Raskar | G01S 7/493 |
| 9,497,442 B2 | 11/2016 | Russell et al. | |
| 9,773,155 B2* | 9/2017 | Shotton | G01S 17/10 |
| 9,823,340 B2* | 11/2017 | Ko | G01S 17/36 |
| 9,864,049 B2* | 1/2018 | Mellot | G01S 7/484 |
| 9,866,816 B2* | 1/2018 | Retterath | G01S 17/18 |
| 9,897,699 B2* | 2/2018 | Kadambi | G01S 17/89 |
| 10,012,532 B2* | 7/2018 | Send | G01S 17/04 |
| 10,061,028 B2 | 8/2018 | Koppal et al. | |
| 10,254,407 B2* | 4/2019 | Mohseni | G02F 1/015 |
| 10,311,282 B2* | 6/2019 | Shotton | G06K 9/6282 |
| 10,311,378 B2* | 6/2019 | Nowozin | G06T 7/521 |
| 10,397,552 B2* | 8/2019 | Van Nieuwenhove | H04N 13/207 |
| 10,474,248 B2* | 11/2019 | Viswanathan | G06K 9/00362 |
| 10,591,599 B2* | 3/2020 | O'Keeffe | G01S 17/66 |
| 2013/0107000 A1 | 5/2013 | Xue et al. | |
| 2013/0207970 A1 | 8/2013 | Shpunt et al. | |
| 2014/0139632 A1 | 5/2014 | Livshitz | |
| 2015/0062558 A1 | 3/2015 | Koppal et al. | |
| 2016/0005179 A1 | 1/2016 | Petyushko et al. | |
| 2016/0086341 A1 | 3/2016 | Bernal et al. | |
| 2016/0377720 A1 | 12/2016 | Jung et al. | |
| 2017/0068319 A1 | 3/2017 | Viswanathan | |
| 2018/0231372 A1 | 8/2018 | Trail | |

OTHER PUBLICATIONS

Li F, Chen H, Yeh CK, Veeraraghavan A, Cossairt O. High spatial resolution time-of-flight imaging. InComputational Imaging III May 14, 2018 (vol. 10669, p. 1066908). International Society for Optics and Photonics.*

Salinas C, Fernández R, Montes H, Armada M. A new approach for combining time-of-flight and RGB cameras based on depth-dependent planar projective transformations. Sensors. Sep. 2015;15(9):24615-43.*

Li F, Willomitzer F, Rangarajan P, Gupta M, Velten A, Cossairt O. Sh-tof: Micro resolution time-of-flight imaging with superheterodyne interferometry. In2018 IEEE International Conference on Computational Photography (ICCP) May 4, 2018 (pp. 1-10). IEEE.*

Li F, Willomitzer F, Rangarajan P, Velten A, Gupta M, Cossairt O. Micro Resolution Time-of-Flight Imaging. InComputational Optical Sensing and Imaging Jun. 25, 2018 (pp. CM2E-4). Optical Society of America.*

International Search Report dated May 29, 2019 issued in counterpart application No. PCT/KR2019/000221, 8 pages.

* cited by examiner

METHOD AND DEVICE FOR OBTAINING 3D IMAGES

CROSS-REFERENCE TO RELATED APPLICATION(S)

This application is based on and claims priority under 35 U.S.C. § 119 to Korean Patent Application No. 10-2018-0103662, filed on Aug. 31, 2018, in the Korean Intellectual Property Office, and Korean Patent Application No. 10-2018-0112975, filed on Sep. 20, 2018, in the Korean Intellectual Property Office, the disclosure of each of which is incorporated by reference herein in its entirety.

BACKGROUND

1. Field

The present disclosure relates generally to methods and devices for obtaining three-dimensional (3D) images, and more specifically, to methods and devices for obtaining the depths of objects or scenes.

2. Description of Related Art

The growth of augmented reality (AR) and virtual reality (VR) technology led to an increasing interest in three-dimensional (3D) cameras. 3D cameras may be installed in various electronic devices, such as mobile devices or computers, or may be provided as standalone electronic devices.

3D cameras may adopt a stereoscopic passive or active projective scheme in order to obtain 3D images. Stereoscopic passive schemes may generate a sparse or semi-sparse depth map for an environment. However, stereoscopic passive schemes are inefficient under low-texture and low-illumination conditions. Creating a dense depth map requires higher calculation complexity.

To generate a depth map, active projective schemes may use a time-of-flight (ToF) of light projected from the 3D camera or a distortion of a pattern projected from the 3D camera. In using the ToF, the depth map may be obtained based on distances between multiple points and a scene calculated based on a plurality of ToFs. However, this scheme may exhibit significant depth errors within a short range.

A pattern distortion scheme may obtain a depth map by projecting a particular pattern onto an object or scene, detecting the pattern distorted by the object or scene, and then basing the depth map on the detected pattern distortion. Triangulation may be used to calculate a distance between the pattern distortion and the object. The pattern distortion scheme may also be referred to as a triangulation technique or a structured light (SL) scheme, as the pattern is regarded as SL. Errors in the triangulation technique may be minor within a short range but often become serious as the range expands due to limitations of triangulation itself.

As such, it is often difficult to apply conventional techniques for obtaining 3D images to AR/VR applications that require a higher-quality of depth map in a wide depth range.

SUMMARY

Accordingly, an aspect of the present disclosure is to provide a method and a device for adaptively obtaining a higher-quality depth map in a wider depth range.

In accordance with an aspect of the present disclosure, a method is provided for obtaining a 3D image by a device including a beam projector and a beam detector. The method includes sequentially projecting, from the beam projector, a plurality of beams to an object, each of the plurality of projected beams corresponding to a respective one of a plurality of sectors included in a pattern; detecting, by the beam detector, a plurality of beams reflected off of the object corresponding to the plurality of projected beams; identifying ToF of each of the plurality of projected beams based on the plurality of detected beams; identifying a distortion of the pattern, which is caused by the object, based on the plurality of detected beams; and generating a depth map for the object based on the distortion of the pattern and the ToF of each of the plurality of projected beams, wherein the plurality of detected beams are commonly used to identify the ToF and the distortion of the pattern.

In accordance with an aspect of the present disclosure, a device is provided for obtaining a 3D image. The device includes a beam projector configured to sequentially project a plurality of beams to an object, each of the plurality of projected beams corresponding to a respective one of a plurality of sectors included in a pattern; a beam detector configured to detect a plurality of beams reflected off of or the object corresponding to the plurality of projected beams; and a controller configured to identify ToF of each of the plurality of projected beams based on the plurality of detected beams, identify a distortion of the pattern, which is caused by the object, based on the plurality of detected beams, and generate a depth map for the object based on the distortion of the pattern and the ToF of each of the plurality of projected beams, wherein the plurality of detected beams are commonly used to identify the ToF and the distortion of the pattern.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Various embodiments of the present disclosure will now be described in detail with reference to the accompanying drawings. In the following description, specific details such as detailed configuration and components are merely provided to assist the overall understanding of these embodiments. Therefore, those skilled in the art will understand that various changes and modifications of the embodiments described herein can be made without departing from the scope and spirit of the present disclosure. In addition, descriptions of well-known functions and constructions are omitted for clarity and conciseness.

Although numerical terms, such as "first" and "second" may be used to describe various components, the components are not limited by the terms. These terms are provided simply to distinguish one component from another. Accordingly, a first component as described herein may also be referred to as a second component within the technical spirit of the disclosure, and vice versa.

Figure 1:
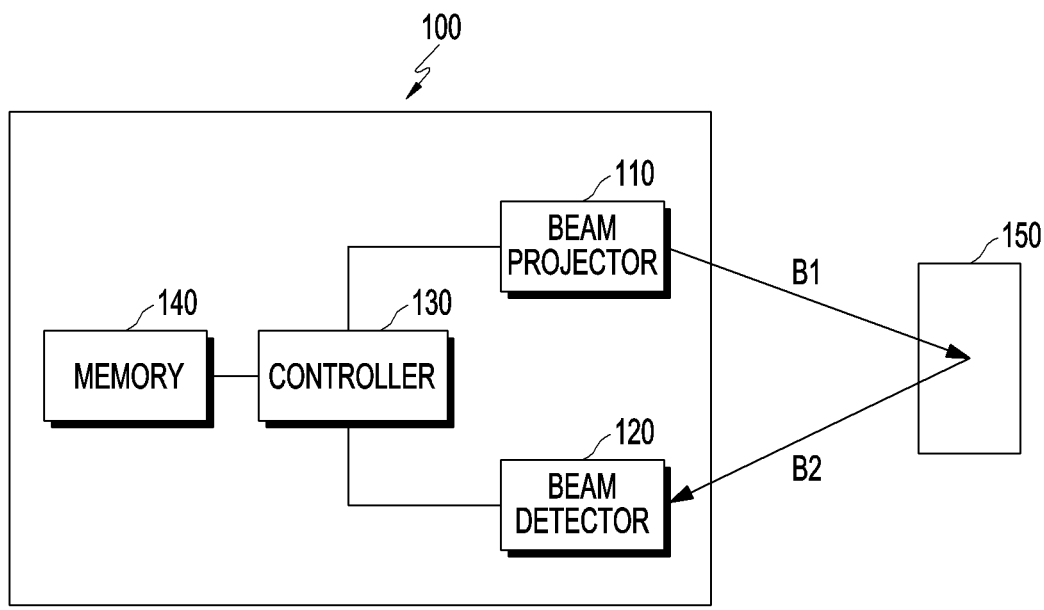
FIG. 1 is a block diagram illustrating a device for obtaining a 3D image according to an embodiment.

FIG. 1 is a block diagram illustrating a device for obtaining a 3D image according to an embodiment.

Referring to FIG. 1, a device 100 for obtaining 3D images may be a 3D camera or an electronic device including a 3D camera. The device 100 includes a beam projector 110, a beam detector 120, a controller 130, and a memory 140.

The beam projector 110 may generate a beam and project the beam to a scene 150 or an object. The scene 150 may denote an area where beams generated by the beam projector 110 are projected to generate a 3D image. An object may denote a thing for generating a 3D image. The beam generated by the beam projector 110 may be an infrared ray (IR) beam, but without being limited thereto, may also be a visible or ultraviolet (UV) beam or other various frequencies of beams.

Figure 2:
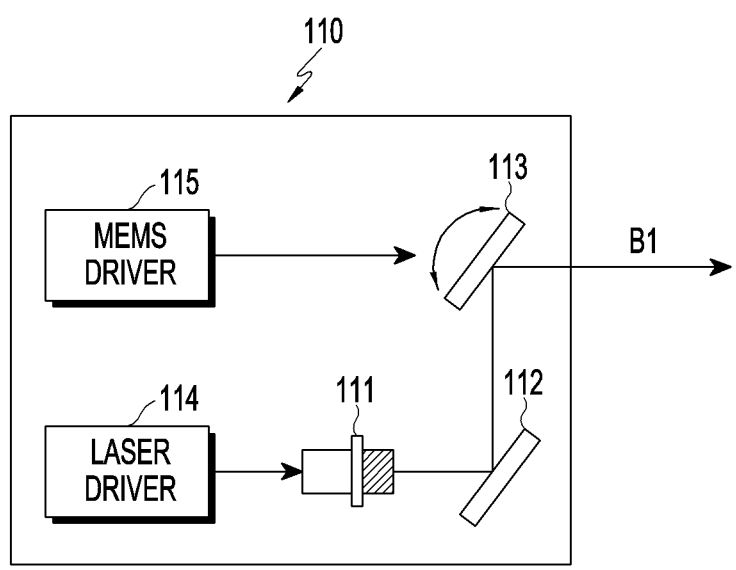
FIG. 2 is a block diagram illustrating a beam projector according to an embodiment.

FIG. 2 is a block diagram illustrating a beam projector according to an embodiment.

Referring to FIG. 2, the beam projector 110 includes a laser 111, a laser driver 114, a first mirror 112, a second mirror 113, and a microelectromechanical system (MEMS) driver 115. The laser 111 may generate and emit laser beams of a preset frequency. The operation of the laser 111 may be controlled by the laser driver 114. The laser beam emitted from the laser 111 is directed to the first minor 112, which reflects the laser beam to the second mirror 113. For example, the first mirror 112 may be a fixed minor, but is not limited thereto. The second mirror 113 reflects the laser beam from the first mirror 112 to the scene 150. The second mirror 113 may be rotated to control the direction of the beam B1 emitted from the beam projector 110. For example, the second mirror 113 may be rotated around two axes.

A MEMS may be used to operate the second mirror 113. The MEMS driver 115 may control the rotation of the second mirror 113 using the MEMS.

Referring back to FIG. 1, the beam detector 120 may detect the beam B2, which is emitted from the beam projector 110 and reflected by the scene 150. The beam detector 120 may detect the presence or absence of the reflected beam B2 and its brightness or intensity. For example, the beam detector 120 may detect IR beams. However, the frequency band of beams detectable by the beam detector 120 is not limited to IR bands.

The beam detector 120 may be configured to detect the frequency band of the beam B1 emitted from the beam projector 110. The beam detector 120 may detect the signal of the frequency band of the reflected beam B2. The beam detector 120 may be a two-dimensional (2D) camera capable of capturing a particular area (e.g., the area of the scene 150). The 2D camera may include an array of photosensitive pixels. For example, the photosensitive pixels of the 2D camera may be divided into pixels for detecting the ToF and pixels for detecting the reflected pattern. Alternatively, at least one of the photosensitive pixels of the 2D camera may be used to detect the ToF and the reflected pattern.

The controller 130 may control the operations of the beam projector 110 and the beam detector 120. The controller 130 may calculate and generate a depth map for the scene 150 or object based on the reflected beam B2 detected by the beam detector 120.

The memory 140 may store instructions to operate the controller 130. The memory 140 may store permanent or temporary data necessary to operate the controller 130. The memory 140 may store information about one or more patterns used for the beam projector 110 to project the beam B1.

Figure 3:
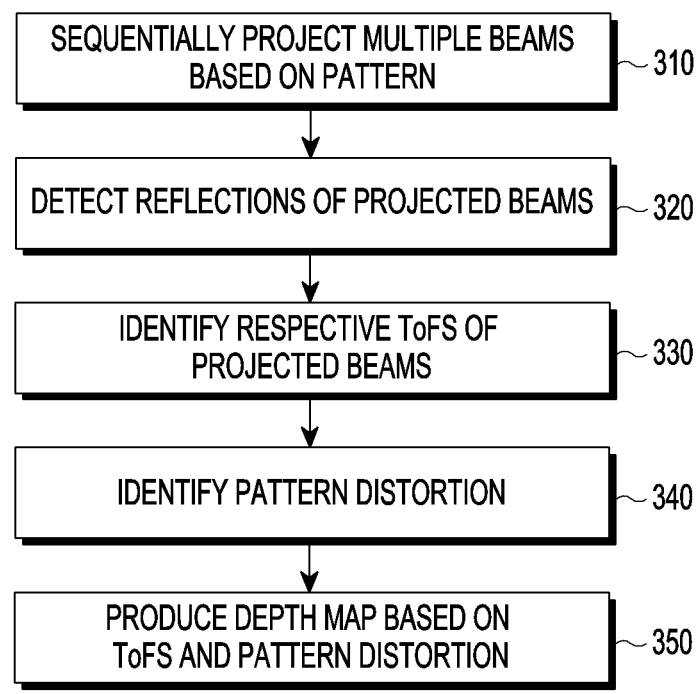
FIG. 3 is a flowchart illustrating a method for obtaining a 3D image according to an embodiment.

FIG. 3 is a flowchart illustrating a method for obtaining a 3D image according to an embodiment. For example, the method of FIG. 3 may be carried out by a device, such as the device 100 as illustrated in FIG. 1, for obtaining 3D images, or more specifically, the method of FIG. 3 may also be performed by a controller, such as the controller 130 as illustrated in FIG. 1, which substantially controls the operations of the components of the device 100 for obtaining 3D images.

Referring to FIG. 3, in step 310, the device 100 sequentially projects a plurality of beams based on a pattern.

In step 320, the device 100 detects reflections of the plurality of beams, e.g., beams reflected off of the scene 150.

In step 330, the device 100 identifies respective ToFs of the plurality of projected beams, based on the detected reflections of the plurality of beams.

In step 340, the device 100 identifies a distortion of the pattern, and in step 350, the device 100 generates a depth map based on the ToFs and the pattern distortion.

Figure 4:
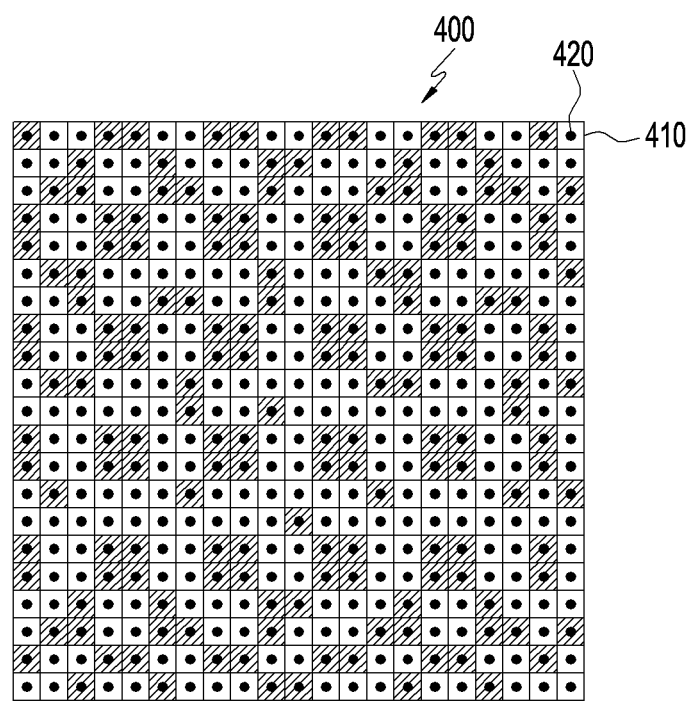
FIG. 4 illustrates a pattern for projecting a plurality of beams according to an embodiment.

FIG. 4 illustrates a pattern for projecting a plurality of beams according to an embodiment. For example, the pattern in FIG. 4 may be used to sequentially project a plurality of beams in step 310.

Referring to FIG. 4, a pattern 400 is split into a plurality of sectors (or sections) 410. Each of the sectors 410 of the pattern 400 is denoted by a pixel. The beams may be projected corresponding to their respective sectors. The beams corresponding to darker sectors of the plurality of sectors 410 and the beams corresponding to brighter sectors of the plurality of sectors 410 may be modulated differently. For example, the beams corresponding to the darker sectors and the beams corresponding to the brighter sectors may differ in at least one of brightness, intensity, size, diameter, and/or frequency.

Spots 420 indicate sectors for measuring ToF among the plurality of sectors 410. ToFs may be obtained based on the reflected beams of the beams projected corresponding to the sectors for measuring ToF. Although FIG. 4 illustrates that all of the plurality of sectors 410 are used for measuring ToF, alternatively, only some of the plurality of sectors 410 may be used for measuring ToF.

According to an embodiment, a pattern, such as the pattern 400, may be generated by merging a first pattern for detecting a distortion of individual patterns and a second pattern for detecting ToF.

Figure 5:
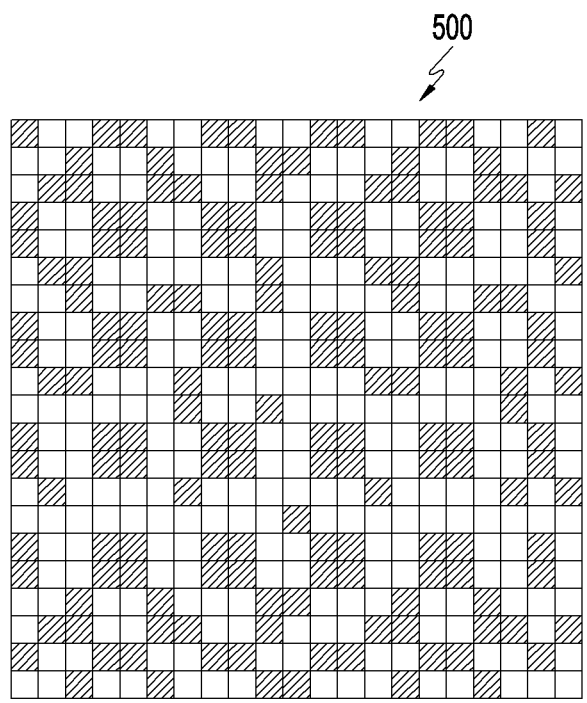
FIG. 5 illustrates a pattern for detecting distortion according to an embodiment.
Figure 6:
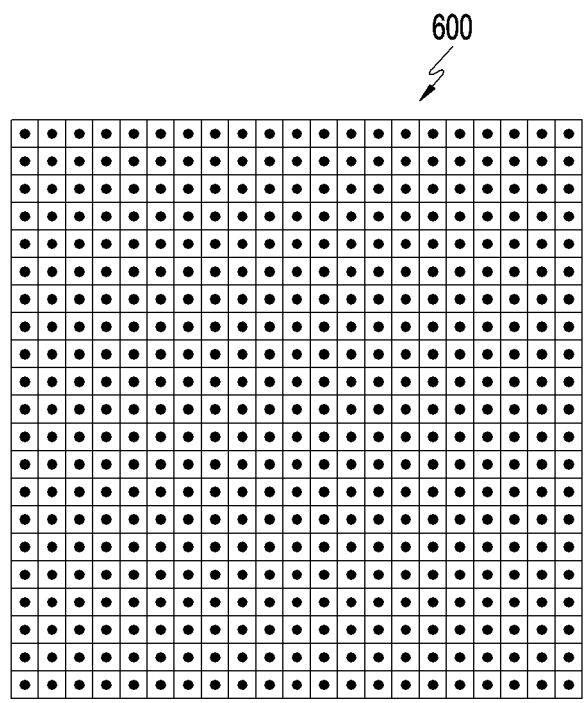
FIG. 6 illustrates a pattern for detecting ToF according to an embodiment.

FIG. 5 illustrates a pattern for detecting distortion according to an embodiment, and FIG. 6 illustrates a pattern for detecting ToF according to an embodiment.

Referring to FIGS. 5 and 6, the device 100 (or the controller 130) may generate the pattern 400 by merging a first pattern 500 and a second pattern 600, e.g., stored in the memory 140. Accordingly, the device 100 may generate a pattern for projecting beams by selectively merging one of a plurality of first patterns for detecting pattern distortion with one of a plurality of second patterns for detecting ToF, thereby adaptively and easily generating and applying various pattern shapes.

According to an embodiment, a pattern for projecting beams may be modified and generated from an original pattern. For example, the device 100 may generate the pattern for projecting beams from an original pattern stored in the memory 140.

The modified pattern may be generated by modifying the resolution of the original pattern.

Figure 7:
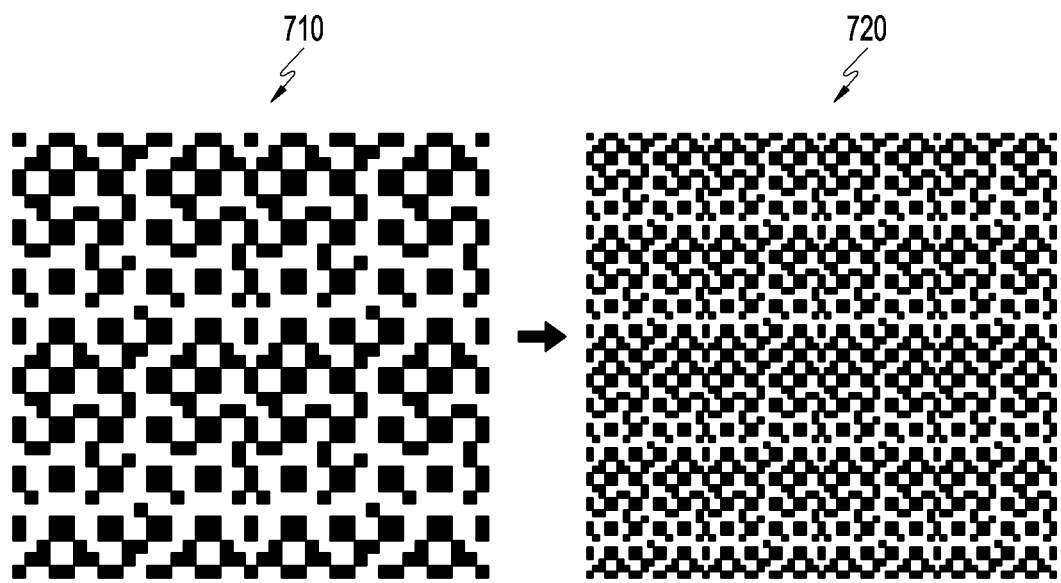
FIG. 7 illustrates an example of modifying resolution of a pattern according to an embodiment.

FIG. 7 illustrates an example of modifying resolution of a pattern according to an embodiment.

Referring to FIG. 7, a modified pattern 720 may be generated by increasing the resolution of an original pattern 710. Although not illustrated in FIG. 7, each of the plurality of sectors split from the modified pattern may be smaller in size than each of the plurality of sectors split from the original pattern 710. The modified pattern may be generated by decreasing the resolution of the original pattern.

A modified pattern may be generated by shifting an original pattern.

Figure 8:
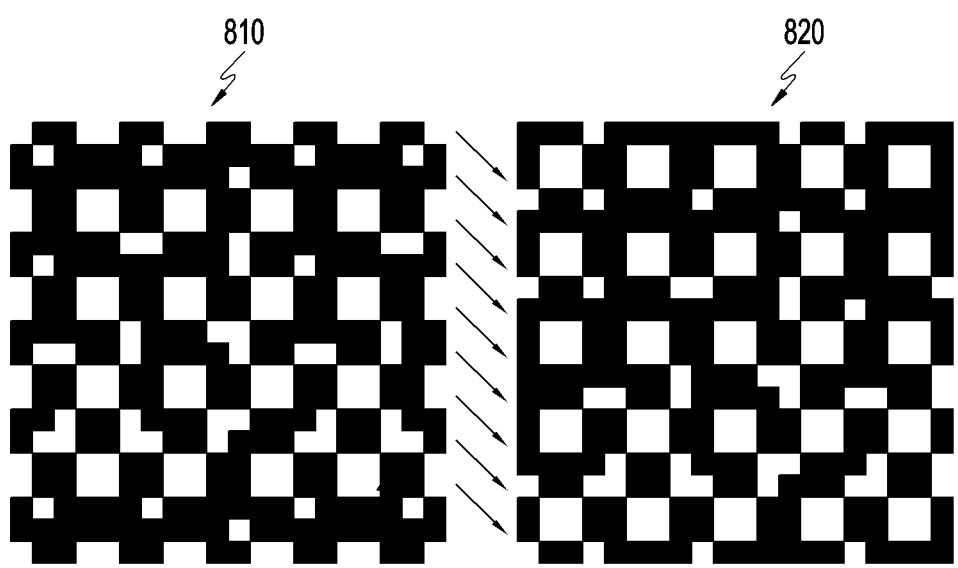
FIG. 8 illustrates an example of pattern shifting according to an embodiment.

FIG. 8 illustrates an example of pattern shifting according to an embodiment.

Referring to FIG. 8, a modified pattern 820 may be generated by shifting an original pattern 810 in a right and downward direction. The direction of shifting may differ according to embodiments.

A plurality of modification methods may simultaneously be used to generate the modified pattern.

The resolution of a pattern for projecting beams may be uneven in the pattern.

Figure 9:
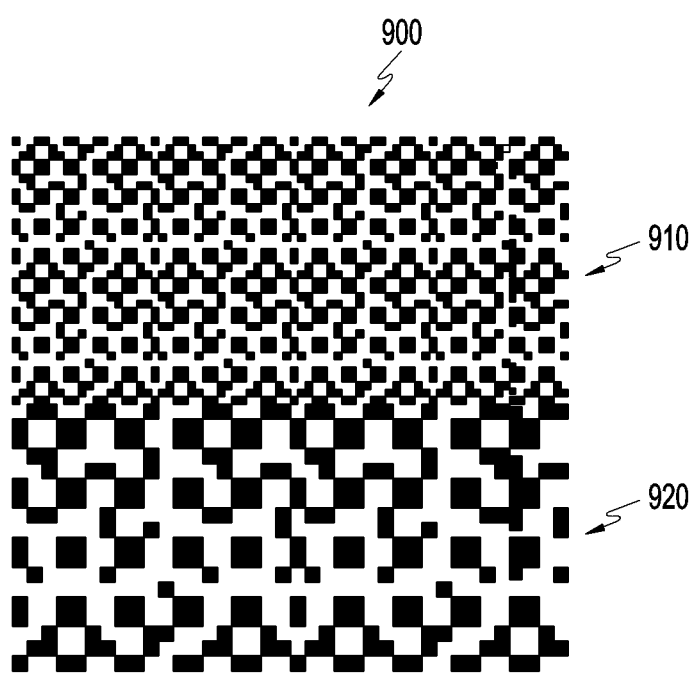
FIG. 9 illustrates a pattern according to an embodiment.

FIG. 9 illustrates a pattern according to an embodiment.

Referring to FIG. 9, a pattern 900 includes a first portion 910 with a first resolution and a second portion 920 with a second resolution, which is lower than the first resolution. For example, the first portion 910, which has a relatively larger resolution, may correspond to a region of interest (ROI). The pattern 900 may be generated by merging the original pattern and the pattern obtained by modifying the resolution of the original pattern.

In step 310 of FIG. 3, the plurality of beams may sequentially be projected corresponding to their respective sectors from the plurality of sectors.

Figure 10:
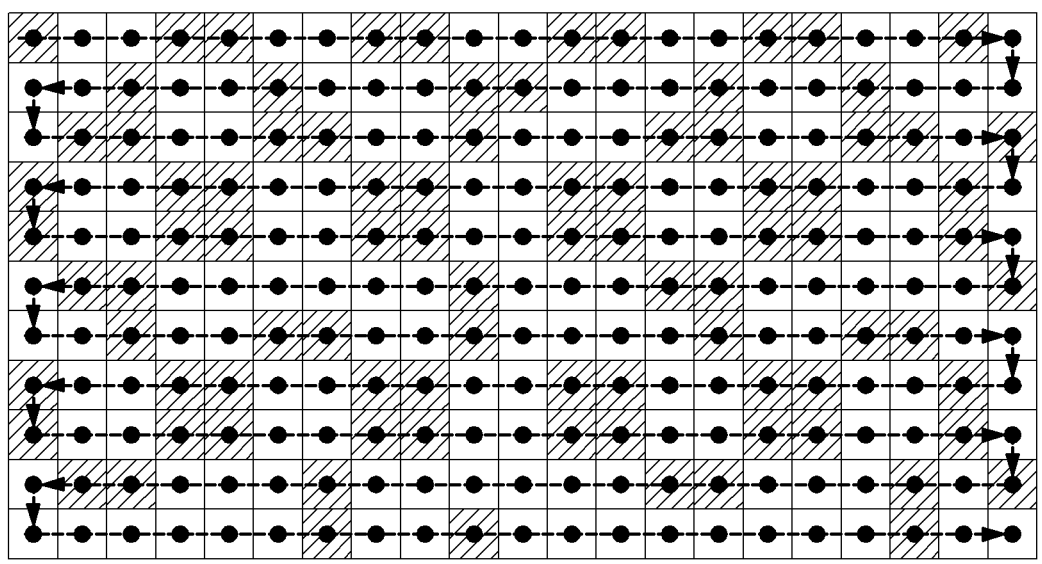
FIG. 10 illustrates an order of projecting beams based on a pattern according to an embodiment.

FIG. 10 illustrates an order of projecting beams based on a pattern according to an embodiment.

Referring to FIG. 10, the plurality of beams are projected in a zigzag shape. Alternatively, the plurality of beams may be projected vertically in a zigzag shape. Although projecting in a zigzag shape may be advantageous in light of the efficiency of the operation of the beam projector 120 to control the position of beams projected, the actual order of projecting the plurality of beams may be varied as necessary.

Figure 11:
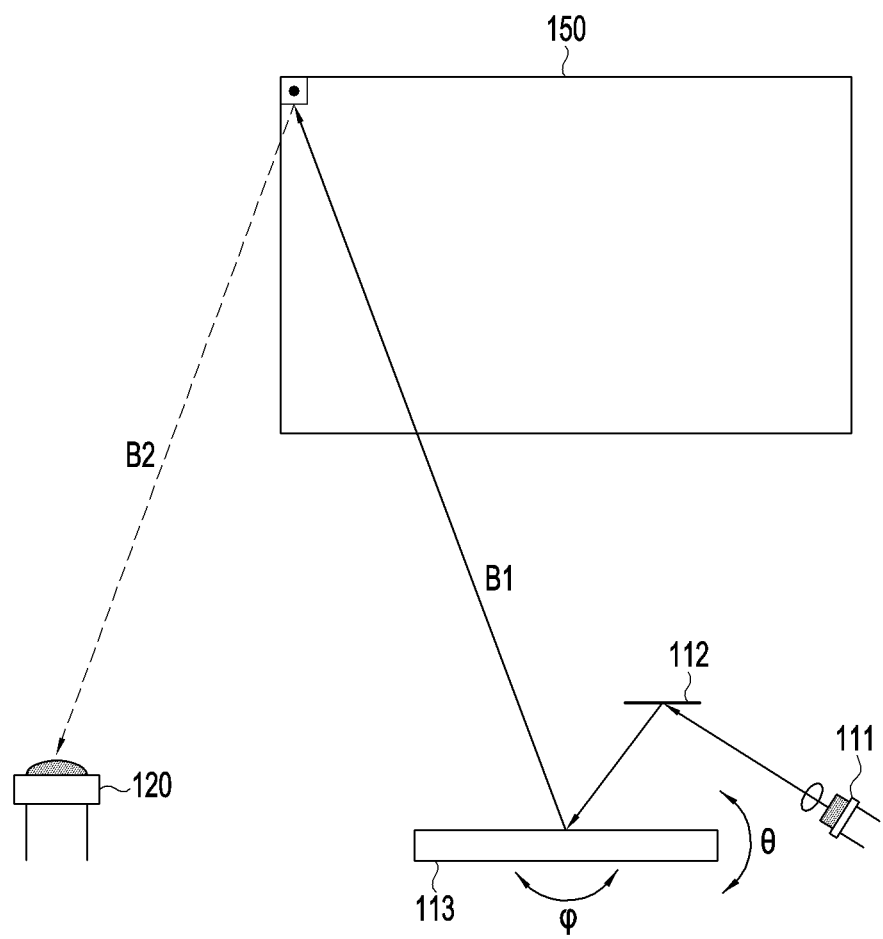
FIG. 11 illustrates an example of projecting a beam and detecting a reflection according to an embodiment.

FIG. 11 illustrates an example of projecting a beam and detecting a reflection according to an embodiment.

Referring to FIG. 11, the laser 111 may generate a beam (a laser), corresponding to one of the plurality of sectors constituting a pattern. The beam emitted from the laser 111 is reflected by the first mirror 112 and directed to the second mirror 113. The horizontal angle $\theta$ and vertical angle $\varphi$ of the second mirror 113 may be adjusted. The horizontal angle $\theta$ and vertical angle $\varphi$ of the second angle 113 may be set for the first beam B1 reflected by the second mirror 113 to be directed to a desired location. The horizontal direction of the first beam B1 may be controlled by the horizontal angle $\theta$, and the vertical direction of the first beam B1 may be controlled by the vertical angle $\varphi$. The horizontal angle $\theta$ and vertical angle $\varphi$ of the second mirror 113 may be set for the first beam B1 to be directed to a location within the scene 150 corresponding to the sector corresponding to the beam among the plurality of sectors of the pattern.

The second beam B2, which is the reflection of the first beam B1 by the scene 150, may be detected by the beam detector 120, e.g., in step 320 FIG. 3.

After projecting the beam corresponding to one of the plurality of sectors of the pattern and detecting the reflected beam by the above-described method, a beam corresponding to a next sector may be projected such that its reflection may be detected, e.g., in the zigzag order illustrated in FIG. 10.

By repeating the process, the projection of the beams corresponding to the plurality of sectors of the pattern and the detection of their reflections may be fulfilled.

When sequentially projecting a plurality of beams based on a pattern, such as illustrated in step 310 of FIG. 3, all, or at least some, of the plurality of beams projected may be jointly used to generate a depth map using the ToF scheme and the SL scheme. For example, when a first pattern for detecting pattern distortion and a second pattern for detecting ToF, which are merged to generate a pattern for sequentially projecting a plurality of beams, differ in resolution or arrangement of sectors, all of the beams projected do not need to be used to generate a depth map using the ToF scheme or a depth map using the SL scheme. Instead, at least some of the plurality of beams may be jointly used to generate a depth map using the ToF scheme and a depth map using the SL scheme, and the plurality of beams may be scanned once, thereby obtaining both a depth map using the ToF scheme and a depth map using the SL scheme.

To detect reflections of a plurality of projected beams, such as in step 320 of FIG. 3, the beam detector 120 may detect a plurality of second beams B2. The beam detector 120 may detect a waveform or phase of the detected second beams B2, and the detected waveform or phase may be used to obtain the ToF. The beam detector 120 may detect the brightness of the detected second beams B2. The brightness of each of the plurality of pixels of the 2D camera constituting the beam detector 120 may be stored in the coordinates ($x=f(\theta)$, $y=f(\varphi)$) of the corresponding pixel. Accordingly, the device 100 may obtain the images corresponding to the second beams B2, and the device 100 may obtain the pattern reflected by the scene or object 150 by integrating the plurality of images corresponding to the plurality of second beams B2.

The beam detector 120 may obtain the reflected pattern from a single image generated by integrating optical data related to the plurality of second beams B2 obtained while the plurality of second beams B2 are received, rather than by integrating the plurality of images corresponding to the plurality of second beams B2. Integrating the optical data related to the plurality of second beams B2 may include exposing the 2D camera while the beam detector 120 receives the plurality of second beams B2.

Identifying the sectors corresponding to the second beams B2 among the plurality of sectors of the pattern for projecting beams, projecting the first beam B1 to obtain the ToF, and detecting the second beam B2 may be performed in synchronization with each other. That is, steps 310 and 320 of FIG. 3 may be performed at substantially the same time. For example, the operations of the beam projector 110 (i.e., the operations of the laser 111 and the second mirror 113) and the operations of the beam detector 120 may be synchronized with each other. A sync signal may be used to synchronize the operation of the beam projector 110 with the operation of the beam detector 120. The sync signal may be generated by, or under the control of, the controller 130.

Figure 12:
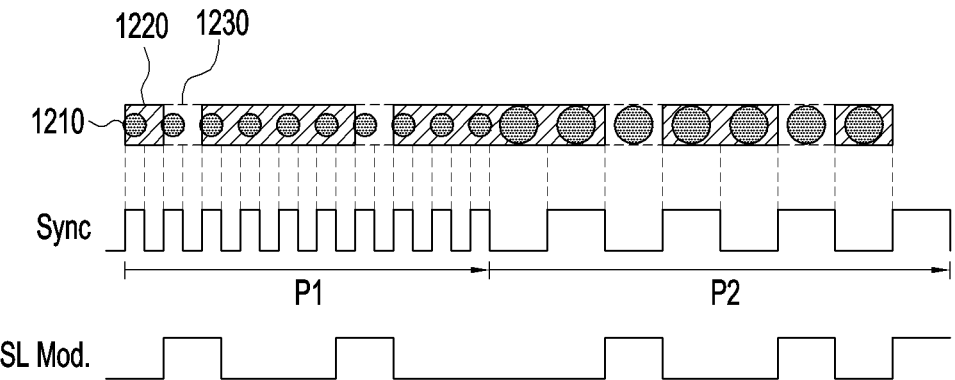
FIG. 12 illustrates a method for projecting a beam using a sync signal according to an embodiment.

FIG. 12 illustrates a method for projecting a beam using a sync signal according to an embodiment.

Referring to FIG. 12, a plurality of beams 1210 may be projected in periods in synchronization with a sync signal Sync and according to a waveform of the sync signal Sync. The period for projecting the beams 1210 may vary, as illustrated in FIG. 12. The period for projecting the beams 1210 may be based on the resolution of the pattern, and when the pattern has sectors with different resolutions, the period may vary. For example, the period for projecting the beams differs between a first period P1 and a second period P2. The period for projecting the beams 1210 in the first period P1 is shorter than the period in the second period P2. Therefore, the resolution of the pattern in the first period P1 may be higher than the resolution of the pattern in the second period P2. The controller 130 may change the frequency of the sync signal Sync to adjust the period for projecting the beams 1210 depending on the variation in resolution. That is, the frequency of the sync signal Sync may increase in order to increase the period for projecting the beams 1210, and the frequency of the sync signal Sync may decrease in order to decrease the period for projecting the beams 1210.

The sync signal Sync may be provided to the beam projector 110 and also to the beam detector 120. Thus, the beam detector 120 may identify, based on the sync signal Sync, a sector among the plurality of sectors dividing the pattern corresponding to a first beam B1 from which the second beam B2 detected is originated.

A modulation control signal SL Mod. may be used to control the modulation of the beams 1210. The beam projector 110 may control the modulation applied to the beams 1210 according to the modulation control signal SL Mod. For example, different modulation schemes may apply to the beams 1210, when the modulation control signal SL Mod. is low and when the modulation control signal SL Mod. is high. The modulation control signal SL Mod. may be set to have a value of "low" corresponding to the darker sectors 1220 of the pattern and a value of "high" corresponding to the brighter sectors 1230 of the pattern, or vice versa, according to an embodiment.

In step 330, the ToFs may be identified based on the detected second beams B2. The detected second beams B2 used to identify the ToFs may also be used to detect the distortion of the pattern as set forth below.

Figure 13:
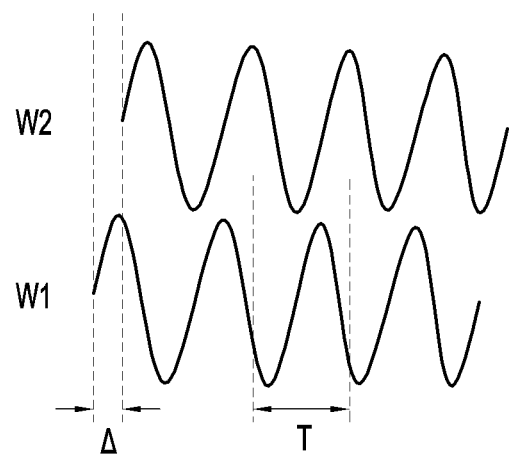
FIG. 13 illustrates a method for detecting ToF according to an embodiment.

FIG. 13 illustrates a method for detecting ToF according to an embodiment.

Referring to FIG. 13, a delay A of the second beam B2 from the first beam B1 may be generated by comparing a waveform W1 of the first beam B1 emitted from the beam projector 110 with a waveform W2 of the second beam B2 detected by the beam detector 120, or by comparing a phase of the first beam B1 with a phase of the second beam B2. When the period of the first beam B1 and the second beam B2 is T, the ToF of beam may be obtained using Equation (1) below.

$$ToF = T \times \Delta / (2 \times \pi) \quad (1)$$

The distance D to where the beam is reflected may be obtained based on the ToF, using Equation (2) below.

$$D = (ToF \times c)/2 \quad (2)$$

In Equation (2), c refers to the speed of light.

According to an embodiment, the controller 130 may obtain a variation in brightness by differentiating the brightness of the image obtained by the 2D camera of the beam detector 120 and may obtain the arrival time of the beam based on the variation in brightness. The controller 130 may calculate the delay θ from the difference between the obtained beam arrival time and the time the beam is emitted.

Accordingly, the respective ToFs of the plurality of beams may be obtained, and the respective distances (Ds) for the plurality of beams may be obtained based on the obtained plurality of ToFs. A ToF-based depth map may be generated based on the plurality of Ds.

In the step 340, the pattern distorted by the scene or object 150 may be obtained based on the plurality of second beams B2 detected by the beam detector 120. All, or at least some, of the plurality of detected second beams B2, which are used to obtain the distorted pattern, may be used to identify the ToFs in the step 330. As such, the plurality of second beams B2 detected may be jointly used to obtain the ToFs and the pattern distortion, thereby allowing both a ToF scheme-based depth map and an SL scheme-based depth map to be obtained in a simplified manner.

A reflected pattern (i.e., the pattern distorted by the scene or object 150) may be obtained by integrating the plurality of images for the scene 150 obtained by the beam detector 120, e.g., a 2D camera. Here, each of the plurality of images may correspond to a corresponding one of the plurality of second beams B2.

Integrating the plurality of images may include summating or averaging the brightness of the pixels with the same coordinates of the plurality of images. The pattern distortion may be identified by comparing the reflected pattern obtained with the original pattern. The distance to the scene or object 150 corresponding to each of the plurality of sectors of the pattern may be obtained based on the pattern distortion. The less pattern distortion, the larger the distance to the scene or object 150 may be identified. Thus, a depth map may be generated based on pattern distortion. The pattern distortion-based depth map may also be referred to as an SL-based depth map.

Figure 14:
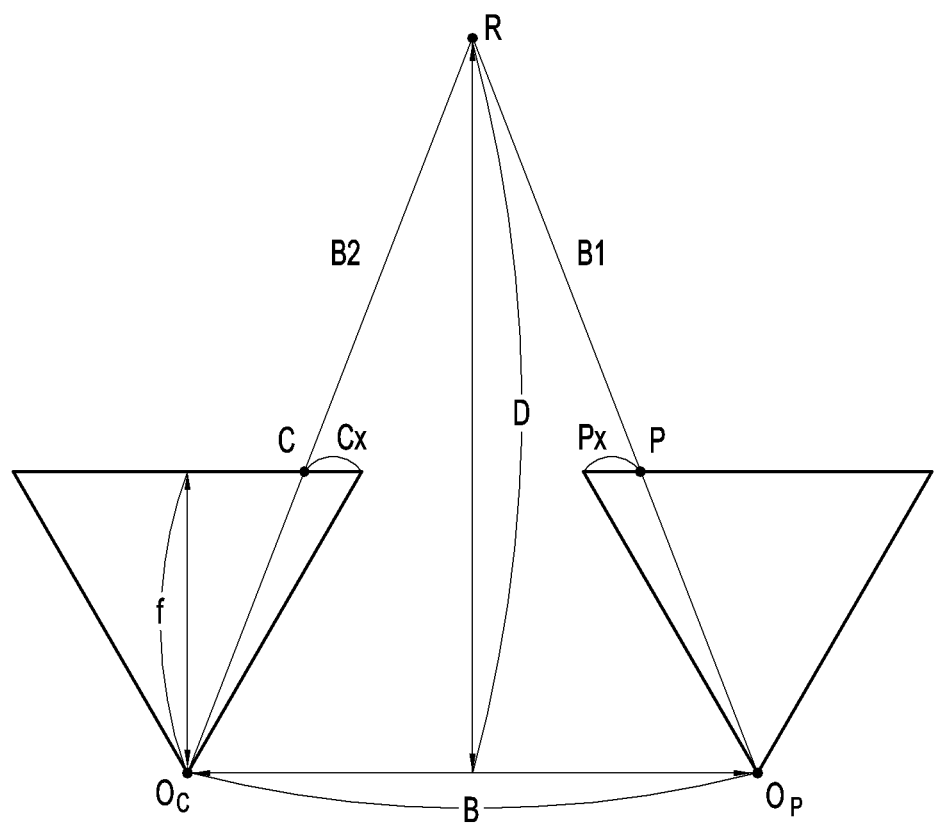
FIG. 14 illustrates a method for obtaining the distance to an object based on SL according to an embodiment.

FIG. 14 illustrates a method for obtaining a distance to an object based on SL according to an embodiment.

Referring to FIG. 14, the beam B1 emitted from the origin Op of a beam projector is reflected at a reflection point R of a scene or object and is detected by a beam detector. The position P corresponding to the beam B1 on the original pattern and the position C corresponding to the reflected beam B2 on the image detected by the beam detector may be in the same epipole line. The distance D to the reflection point R may be obtained using Equation (3) below.

$$D = (f \times B)/d \quad (3)$$

In Equation (3), f refers to the focal length of the 2D camera of the beam detector, and B refers to the length of a baseline between the origin Op of the beam projector and the origin Oc of the 2D camera. 'd' denotes the disparity between the position P corresponding to the beam B1 on the original pattern and the position C corresponding to the reflected beam B2 on the image detected by the beam detector.

When the original pattern and the reflected pattern are set to have the same resolution, d may be expressed as the disparity between the x coordinate (Px) of the position P corresponding to the beam B1 on the original pattern and the x coordinate (Cx) of the position C corresponding to the reflected beam B2 on the reflected pattern.

A depth map, e.g., as generated in step 350 of FIG. 3, may be generated by merging the above-mentioned first depth map, which is created based on ToF, and second depth map, which is created based on pattern distortion. The first depth map and the second depth map may be merged by various methods.

For example, the first depth map and the second depth may be merged by a weighted sum. As the distance to the scene or object 150 decreases for each pixel, a lower weight may be assigned to the distance of the first depth map, and a higher weight to the second depth map. As the distance to the scene or object 150 increases for each pixel, a higher weight may be assigned to the distance of the first depth map, and a lower weight to the second depth map. The distance to the scene or object 150 to determine the weights may be determined by the distance of the first depth map, the distance of the second depth map, a mean of the distances of the first depth map and the second depth map, or a weighted sum of the distances of the first depth map and the second depth map. When generated by merging the ToF-based depth map and the pattern distortion-based depth map, the depth map may reduce errors regardless of whether it is within a short or long distance.

According to an embodiment, the merged depth map may be obtained by using Equation (4) below.

$$z(x, y) = \begin{cases} D1(x, y), & \text{if } \sigma D(x, y) < \sigma T(x, y) \\ T1(x, y), & \text{otherwise} \end{cases} \quad (4)$$

In Equation (4), z(x,y) refers to a depth at a pixel with the coordinates (x,y) of the merged depth map. D1 (x,y) refers to a depth at a pixel with the coordinates (x,y) of the second depth map generated by the SL scheme. T1 (x,y) refers to a depth at a pixel with the coordinates (x,y) of the first depth map generated by the ToF scheme. σD(x,y) refers to a standard depth deviation obtained based on depths of neighboring pixels of the pixel with the coordinates (x,y) of the second depth map. σT(x,y) refers to a standard depth deviation obtained based on depths of neighboring pixels of the pixel with the coordinates (x,y) of the first depth map.

For example, the merged depth map may be generated using ultra-high resolution techniques based on Markov random fields.

Merging the first depth map and the second depth map is not limited to the above-described methods, but may optionally adopt other various known methods, their variations, or newly developed methods.

When the first depth map and the second depth map differ in resolution, a process for matching the resolution of the first depth map with the resolution of the second depth map may performed prior to merging the first depth map and the second depth map.

The quality of the generated depth map may be identified after generating the depth map based on ToF and pattern distortion.

For example, when the identified quality of the depth map generated in FIG. 3 is worse than a threshold, steps 310, 320, 330, 340, and 350 may be performed again using a pattern different than the prior pattern, and such a process may be repeated until a depth map with sufficient quality, i.e., equal to or greater than the threshold, is obtained.

The pattern used for the repeated process may be completely different from the prior pattern or a modification of the prior pattern may be used (e.g., one resulting from modifying the resolution of all or part of the prior pattern or one shifted from the prior pattern).

As described above, a method and a device for obtaining a 3D image, according to embodiments, may simultaneously obtain ToF and pattern distortion by point-to-point beam projection and detection, which alleviates the calculation load of conventional processes. Further, the point-to-point beam projection and detection may modify or alter the pattern for projecting beams in a simplified manner.

As is apparent from the foregoing description, various embodiments of the disclosure present at least the following effects:

A high-quality depth map may be obtained in a wide depth range.

A method may be provided for obtaining a depth map in an adaptively variable manner.

A load of calculations in generating a high-quality depth map may be reduced.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for obtaining a three-dimensional (3D) image by a device including a beam projector and a beam detector, the method comprising:

sequentially projecting, from the beam projector, a plurality of beams to an object, wherein each of the plurality of beams is modulated based on a corresponding one of a plurality of sectors included in a pattern, and is projected;

detecting, by the beam detector, a plurality of beams reflected off of the object corresponding to the plurality of projected beams;

identifying time-of-flight (ToF) of each of the plurality of projected beams based on the plurality of detected beams;

identifying a distortion of the pattern, which is caused by the object, based on the plurality of detected beams; and generating a depth map for the object based on the distortion of the pattern and the To of each of the plurality of projected beams, wherein the plurality of detected beams are commonly used to identify the To and the distortion of the pattern.

2. The method of claim 1, wherein generating the depth map comprises:

generating a first depth map based on the identified ToF;

generating a second depth map based on the identified distortion of the pattern; and generating the depth map based on the first depth map and the second depth map.

3. The method of claim 1, wherein identifying the distortion of the pattern comprises:

obtaining a reflected pattern by the object based on the plurality of detected beams;

comparing the reflected pattern with the pattern; and identifying the distortion of the pattern based on a result of the comparing.

4. The method of claim 1, wherein the plurality of sectors include a first sector corresponding to a first resolution, and a second sector corresponding to a second resolution, which is higher than the first resolution,
wherein a first beam corresponding to the first sector is projected according to a first period, and a second beam corresponding to the second sector is projected according to a second period, and
wherein the second period is shorter than the first period.

5. The method of claim 4, wherein the second sector corresponds to a region of interest (ROI).

6. The method of claim 1, wherein the plurality of detected beams are detected in synchronization with sequential projection of the plurality of projected beams, based on a sync signal.

7. The method of claim 6, wherein the plurality of sectors include a first sector corresponding to a first resolution and a second sector corresponding to a second resolution, which is higher than the first resolution,
wherein upon projecting a first beam corresponding to the first sector, the sync signal has a first frequency, and upon projecting a second beam corresponding to the second sector, the sync signal has a second frequency, and
wherein the first frequency is lower than the second frequency.

8. The method of claim 1, further comprising generating the pattern by modifying an original pattern,
wherein modifying the original pattern comprises at least one of shifting the original pattern, modifying a resolution of all of the original pattern, or modifying a resolution of part of the original pattern.

9. The method of claim 1, wherein the plurality of sectors include a first sector and a second sector, and
wherein a first beam projected corresponding to the first sector and a second beam projected corresponding to the second sector are modulated differently.

10. A device for obtaining a 3D image, the device comprising:
a beam projector;
a beam detector; and
a controller configured to:
control the beam projector sequentially project a plurality of beams to an object, wherein each of the plurality of beams is modulated based on a corresponding one of a plurality of sectors included in a pattern and is projected,
detect, by the beam detector, a plurality of beams reflected off of the object corresponding to the plurality of projected beams,
identify time-of-flight (ToF) of each of the plurality of projected beams based on the plurality of detected beams,
identify a distortion of the pattern, which is caused by the object, based on the plurality of detected beams, and
generate a depth map for the object based on the distortion of the pattern and the ToF of each of the plurality of projected beams,
wherein the plurality of detected beams are commonly used to identify the ToF and the distortion of the pattern.

11. The device of claim 10, wherein the controller is further configured to:
generate a first depth map based on the identified ToF,
generate a second depth map based on the identified distortion of the pattern, and
generate the depth map based on the first depth map and the second depth map.

12. The device of claim 10, wherein the controller is further configured to identify the distortion of the pattern by obtaining a reflected pattern based on the plurality of detected beams, comparing the reflected pattern with the pattern, and identifying the distortion of the pattern based on a result of the comparing.

13. The device of claim 10, wherein the plurality of sectors include a first sector corresponding to a first resolution, and a sector corresponding to a second resolution, which is higher than the first resolution,
wherein a first beam corresponding to the first sector is projected according to a first period, and a second beam corresponding to the second sector is projected in a second period, and
wherein the second period is shorter than the first period.

14. The device of claim 13, wherein the second sector corresponds to a region of interest (ROI).

15. The device of claim 10, wherein the plurality of detected beams are detected in synchronization with the projection of the plurality of projected beams, based on a sync signal.

16. The device of claim 15, wherein the plurality of sectors include a first sector corresponding to a first resolution and a second sector corresponding to a second resolution, which is higher than the first resolution,
wherein upon projecting a first beam corresponding to the first sector, the sync signal has a first frequency, and upon projecting a second beam corresponding to the second sector, the sync signal has a second frequency, and
wherein the first frequency is lower than the second frequency.

17. The device of claim 10, wherein the controller is further configured to generate the pattern by modifying an original pattern, and
wherein modifying the original pattern comprises at least one of shifting the original pattern, modifying a resolution of all of the original pattern, or modifying a resolution of part of the original pattern.

18. The device of claim 10, wherein the plurality of sectors include a first sector and a second sector, and
wherein a first beam projected corresponding to the first sector and a second beam projected corresponding to the second sector are modulated differently.

* * * * *